United States Patent
Miro et al.

[11] Patent Number: 6,111,039
[45] Date of Patent: Aug. 29, 2000

[54] DUAL DONOR CATALYST SYSTEM FOR THE POLYMERIZATION OF OLEFIN

[75] Inventors: Nemesio Delgado Miro, Seabrook; George Byron Georgellis; Homer Swei, both of Houston, all of Tex.

[73] Assignee: Exxon Chemical Patents, Inc., Baytown, Tex.

[21] Appl. No.: 08/770,618

[22] Filed: Dec. 19, 1996

Related U.S. Application Data

[60] Continuation of application No. 08/467,501, Jun. 6, 1995, abandoned, which is a division of application No. 08/192,217, Feb. 4, 1994, abandoned.

[51] Int. Cl.⁷ ..................................................... C08F 4/616
[52] U.S. Cl. ............................ 526/128; 526/90; 526/116; 526/123.1; 526/124.5; 526/125.3; 526/348.3; 526/348.4; 526/348.6; 526/351; 526/352; 525/268; 525/270
[58] Field of Search ........................ 526/116, 90, 123.1, 526/124.5, 125.3, 128, 348.3, 348.4, 348.6, 351, 352; 525/268, 270

[56] References Cited

U.S. PATENT DOCUMENTS

| | | |
|---|---|---|
| 4,218,339 | 8/1980 | Zucchini et al. . |
| 4,328,122 | 5/1982 | Monte et al. . |
| 4,340,704 | 7/1982 | Borghi et al. . |
| 4,395,360 | 7/1983 | Albizatti et al. . |
| 4,473,660 | 9/1984 | Albizzati et al. . |
| 4,493,923 | 1/1985 | McCullough, Jr. . |
| 4,535,068 | 8/1985 | Job . |
| 4,563,512 | 1/1986 | Goodall .................................. 526/125 |
| 4,927,797 | 5/1990 | Ewen ...................................... 502/127 |
| 4,990,477 | 2/1991 | Kioka et al. . |
| 4,990,479 | 2/1991 | Ishimaru et al. . |
| 5,100,981 | 3/1992 | Schreck et al. ......................... 526/125 |
| 5,159,021 | 10/1992 | Kioka et al. . |
| 5,244,989 | 9/1993 | Hara et al. ............................. 526/119 |
| 5,338,801 | 8/1994 | Eppert, Jr. . |
| 5,449,738 | 9/1995 | Koura ...................................... 525/247 |
| 5,455,303 | 10/1995 | Panagopoulos, Jr. et al. . |
| 5,552,482 | 9/1996 | Berta . |
| 5,733,980 | 3/1998 | Cozewiyh et al. . |

FOREIGN PATENT DOCUMENTS

| | | |
|---|---|---|
| 0 385 765 A2 | 9/1990 | European Pat. Off. . |
| 0385765 | 9/1990 | European Pat. Off. . |
| 385765 | 9/1990 | European Pat. Off. . |
| 0 490 353 A2 | 6/1992 | European Pat. Off. . |
| 0 601 496 A1 | 6/1994 | European Pat. Off. . |
| 2 035 343 | 6/1980 | United Kingdom . |
| WO 95/21203 | 8/1995 | WIPO . |

*Primary Examiner*—David W. Wu
*Assistant Examiner*—Ling-Siu Choi
*Attorney, Agent, or Firm*—Douglas W. Miller

[57] ABSTRACT

The present invention provides a catalyst system that exhibits unexpected control of desired properties in polyolefin products. The catalyst system includes a titanium-supported catalyst in combination with a mixture of tetraethoxysilane (TEOS) and dicyclopentyldimethoxy-silane (DCPMS). This catalyst system has been found to be effective in making polypropylene and polypropylene copolymers having relatively high melt flow rates and moderately broad molecular weight distribution.

25 Claims, 4 Drawing Sheets

DUAL DONOR CATALYST SYSTEM FOR THE POLYMERIZATION OF OLEFIN

This is continuation of application Ser. No. 08/467,501, filed Jun. 6, 1995 now abandoned, which is a Rule 60 Divisional of 08/192,217, filed Feb. 4, 1994 now abandoned.

BACKGROUND

1. Field of the Invention

The present invention relates to catalyst components for olefin polymerization which can produce polyolefins, and in particular polypropylene having high crystallinity and relationship high melt flow rates (MFR), and consequently, suitable processing properties.

2. Description of the Prior Art

The homopolymers and copolymers of propylene generally have certain properties that are unsatisfactory for specific applications. It therefore becomes necessary to modify certain characteristics during the manufacture of the polypropylene to render the polymer more useful for a certain end results. For example, if the rigidity of the polymer or copolymer of propylene is improved, it is possible to reduce the thickness of the resulting molded product formed from it.

There are numerous polymerization and copolymerization processes and catalyst systems in the prior art from which it is possible to tailor a processing catalyst system to obtain a specific set of properties of a resulting polymer or copolymer. For example, in certain applications, a product with higher melt flow rate is desirable. Such a product has a lower melt viscosity than a product with a lower melt flow rate. Many polymer or copolymer fabrication processes which operate with high shear rates, such as injection molding, oriented film and thermobinded fibers, would benefit from a lower viscosity product by improving through-put rates and reducing energy costs. Generally, olefin polymers obtained by using an active catalyst component of the magnesium ($MgCl_2$) supported type have a limited melt flow rate range and mechanical properties. As indicated, however, for certain applications, polypropylene polymers which flow readily during melting have improved processing characteristics.

A discovery of more appropriate co-catalysts or electron donors to accompany supported magnesium catalyst components have been of great benefit to improving the efficiency of the catalyst system and the quality control of the polymer product. In such catalyst systems, the cocatalyst activates the catalyst and provides initiation of a polymer chain. The cocatalyst that has historically worked well with magnesium supported catalysts is organo aluminum compounds, most typically triethylaluminum ("TEAL"), or other trialkyl aluminum compounds. Examples of other useful organoaluminum compounds include an alkylaluminum dihalide, a trialkoxyaluminum, a dialkylaluminum halide and a triisobutyl aluminum.

An electron donor compound is used in the polymerization reactor to control the stereoregularity and form of the polymer. Although a broad range of compounds are known generally as electron donors, a particular catalyst may have a specific compound or groups of compounds with which it is especially compatible. Discovery of an appropriate type of electron donor can lead to significant improvement in the properties of the polymer product such as molecular weight distribution and melt flow. Discovery of a specific group of electron donors for magnesium supported catalysts that would provide beneficial results would be highly advantageous.

The present invention is directed to the use of a mixture of silane electron donors. In Mitsui EP 385765A (published Sep. 5, 1990), there is demonstrated a catalyst system composed of a magnesium supported titanium catalyst component in combination with two silane electron donors, a specific donor mixture embodiment of which is directed to dicyclopentyl dimethoxysilane ("DCPMS") and propyltriethoxysilane ("PTES"). In U.S. Pat. No. 5,100,981, disclosed is a catalyst system composed of a magnesium supported titanium catalyst and a mixture of two electron donors, cyclohexylmethyl dimethoxysilane ("CMMS") and phenyltriethoxy silane ("PES").

It has now been surprisingly found that the use of two different organosilicon compounds as electron donors in combination with a magnesium supported catalyst is capable of generating highly isotactic polypropylene polymers having a moderately broad molecular weight distribution as well as relatively high melt flow rates.

SUMMARY OF THE INVENTION

It has been found that a catalyst system based on a solid magnesium supported catalyst component, an organoaluminum co-catalyst component, and a mixture of two different electron donors, one of which functionally dominates the other, is capable of achieving highly crystalline polyolefins having the characteristics of moderately broad molecular weight distribution and relatively high melt flow rates. In a preferred embodiment, two organosilicon compound electron donors, dicyclopentydimethoxysiliane ("DCPMS") and tetraethoxysilane ("TEOS") have been found to provide an optimum electron donor mixture in the instant catalyst system invention. It has been discovered that DCPMS acts as the dominant donor in combination with the weaker donor TEOS. it is found that a mixture of the two donors in a catalyst system generates isotactic polypropylene having product characteristics similar to the polypropylene product generated by a supported catalyst system employing 100% DCPMS such as high crystallinity and low melt flow rate. This discovery enables the use of the weaker donor to make polyolefin polymers in a first stage reaction with the polymer characteristics of the TEOS donor, i.e. high MFR, and polymerizing olefins in the presence of the resulting polyolefin in a second stage reaction with a mixture of the weak donor ("TEOS") and the stronger donor ("DCPMS") to achieve a final highly crystallinity polyolefin polymer having beneficial characteristics of relatively high MFR and moderately broad MWD, these polymer characteristics being otherwise independently obtainable by the sole use of each silane electron donor. In summary, the use of the present dual donor system enables the production of a final polyolefin product with relatively high MFR, a moderately broad MWD similar to that of DCPMS generated polymers.

The surprising and unexpected result in the use of the dual donor system of the present invention lies in the dominant feature of the DCPMS. Ordinarily, it would have been expected that the use of DCPMS in combination with TEOS would result in physical characteristics in the ultimate polymer attributable to the proportionate amount of each electron donor used. However, the discovery that the use of these two donors in a catalyst system generates polyolefins with properties attributable to the dominant electron donor, DCPMS, has resulted in the development of a two stage polymerization process in which a high MFR polyolefin product is made in the first stage through the use of the TEOS donor, while the second stage reaction utilizing a mixture of TEOS/DCPMS enables production of a highly crystalline polyolefin having the characteristics of moderately broad molecular weight distribution and relatively low MFR. In summary, the use of TEOS as an electron donor in a first stage olefin polymerization reaction, followed by introduction of the electron donor DCPMS in a second stage reaction has resulted in the production of crystalline polyolefin products having the characteristics of moderately broad polymer MWDs and relatively high MFRs.

The present invention provides a catalyst system for the polymerization of olefins comprising:

(A) a solid magnesium supported titanium catalyst component;

(B) an organoaluminum cocatalyst; and (C) a Dual Donor catalyst system comprising (1) a first electron donor compound, and (2) a second dominating electron donor compound, wherein, the MFR (a) of a polyolefin obtained by polymerizing an alpha-olefin in the presence of the first electron donor (1) and, the MFR (b) of polyolefin polymerized under the same polymerization conditions, but using a mixed donor system of 50 mole percent (1) and 50 mole percent (2), satisfy the relationship.

$$LOG\left|\frac{[MFR(a)]}{[MFR(b)]}\right| \text{ is } \leq 1.2.$$

The present invention is further directed to a process for making a homopolymer or copolymer, or a reactor blend of homopolymer and copolymer (impact copolymer), of an alpha-olefin having a relatively high melt flow rate, high crystallinity and moderately broad molecular weight distribution comprising polymerizing an alpha-olefin in a multistage reaction in the presence of (1) a high activity magnesium supported titanium catalyst system, (2) an organoaluminum co-catalyst, and (3) an electron donor mixture of two different compounds in at least two stages, comprising:

(A) in the first stage, polymerizing the alpha-olefin in the presence of a first electron donor (i) to produce a polyolefin, and (B) in another stage, further polymerizing olefins in the presence of the polyolefin polymer of stage one in the presence of a donor mixture of the electron donor (i) and a dominating electron donor (ii) to achieve a final polyolefin.

DETAILED DESCRIPTION OF INVENTION

Figure 1:
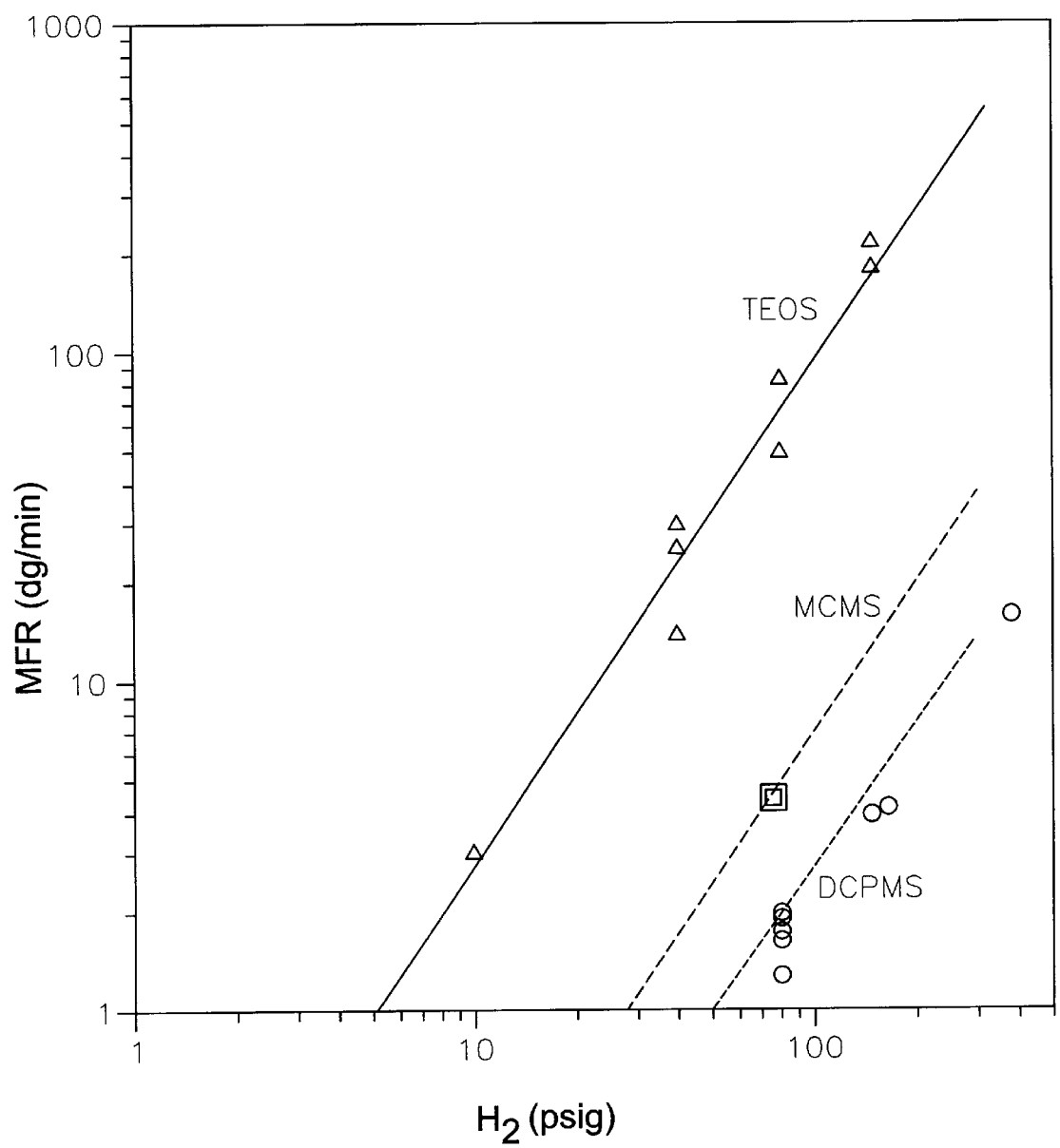
FIG. 1 is a graph demonstrating the relationship between MFR and absorption of hydrogen in the use of TEOS and DCPMS, respectively.

The present invention is directed to the combination of a mixture of two electron donors ("Dual Donors") with a particular type of catalyst component for use in the polymerization of polyolefins. This combination of Dual Donor and catalyst component comprises a catalyst system that results in better control of crystallinity and melt flow rate than that provided alone by either electron donor compound of the Dual Donor system. Moreover, the instant catalyst system maintains a high catalyst efficiency relative to other suitable catalyst systems and, further, the catalyst system of the present invention retains most of its high activity over time. These and other beneficial advantages will become more apparent from the following detailed description of the invention and the accompanying examples.

Electron donors are typically used in two ways in the formation of a Ziegler-Natta catalyst and a catalyst system. First, an internal electron donor may be used in the formation reaction of the catalyst as the transition metal halide is reacted with the metal hydride or metal alkyl. Examples of internal electron donors include: amines, amides, ethers, esters, aromatic esters, ketones, nitrites, phoshines, stilbines, arsines, phosphoramides, thioethers, thioesters, aldehydes, alcoholates, and salts of organic acids. The second use for an electron donor in a catalyst system is as an external electron donor and stereoregulator in the polymerization reaction. The same compound may be used in both instances, although typically they are different. A common external electron donor is an organic silicon compound, for example, tetraethoxysilane, one of the Dual Donors used in the present invention. A description of the two types of electron donors is provided in U.S. Pat. No. 4,535,068, the disclosure of which is hereby incorporated by reference.

As the present invention relates particularly to external electron donors, the term "electron donor" as used herein, refers to the external donor. The external electron donor acts as a stereoregulator to control the amount of atactic form of polymer produced. It may also increase the production of isotactic polymers. In these functions, the MWD, high crystallinity, and MFR of produced polymer will be affected by the particular donor used. Organic silicon compounds are known in the art for use as electron donors. Examples of electron donors that are organic silicon compounds are disclosed in U.S. Pat. Nos. 4,218,339; 4,395,360; 4,328,122; and 4,473,660. As mentioned, a particular catalyst may produce better results when paired with a particular group of electron donors. Examples of this paring of catalyst and electron donors are disclosed in U.S. Pat. Nos. 4,562,173 and 4,547,552.

The effectiveness of the electron donor depends largely on its compatibility with the catalyst with which it is used. Apparently, there is some electrical and/or steric compatibility between certain donors and particular catalysts that yields better results than with the same catalyst and less compatible donors. This compatibility is not totally understood, nor is it predictable as there are no outward suggestions that one electron donor would work better than another with a particular catalyst, and as demonstrated by the present invention, it may be discovered that a certain combination of electron donors are more compatible with a particular type of catalyst than would have been predictable.

It has been discovered herein that a particular combination of electron donors does significantly enhance the catalytic properties of a specific type of catalyst. The catalyst involved in the present invention is a Ziegler-Natta type titanium catalyst for the polymerization of olefins. The instant catalyst system comprises a solid titanium catalyst component in combination with a Dual Donor, and is comprised of:

(A) a highly active magnesium supported titanium catalyst component consisting essentially of magnesium, titanium, halogen and an internal electron donor, (B) an organoaluminum compound, and (C) a Dual Donor wherein one electron donor compound dominates the other.

The processes for polymerizing or copolymerizing olefins in the presence of these Ziegler-Natta type catalysts are disclosed in Japanese Laid-Open Patent Publications numbers 83006/1983, 138705/1983, 138706/1983, 138707/1983, 138708/1983, 138709/1983, 138710/10 and 138715/1983). Typical solid titanium supported catalyst systems and preparations thereof are outlined in U.S. Pat. Nos. 4,990,479 and 5,159,021, the disclosures of which are hereby incorporated by reference.

Briefly, catalyst component (A) can be obtained by (i) suspending the dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

Component B of the instant catalyst system is an organoaluminum compound. The organoaluminum compound should be halogen-free. Suitable halogen-free organoaluminum compounds (component B) are, in particular, branched, unsubstituted alkylaluminum compounds of the formula $AlR_3$, where R denotes an alkyl radical having 1 to 10 carbon atoms, such as for example, trimethylaluminum, triethylaluminum, triisobutylaluminum, and tridiisobutylaluminum. Further suitable compounds are readily available and amply disclosed in the prior art including U.S. Pat. No. 4,990,477 hereby incorporated by reference.

The above-described magnesium supported catalysts component (A) exhibits comparable efficiency to previously known catalyst systems when the component (A) is paired with an appropriate silane electron donor, such as TEOS or DCPMS, but that control is significantly enhanced when the catalyst is paired with a combination of both these electron donors when used in the multi-stage process of the present invention. This improved isotacticity/MFR control results in an enhanced control of the properties of the polymer product.

In a preferred embodiment of the present invention, the external electron donors chosen are the silane compounds dicyclopentyl-dimethoxysilane and tetraethoxysilane. It has been found that when these silanes are used in combination as a Dual Donor in a magnesium supported catalyst system, the DCPMS acts as a dominant donor in generating polyolefins having high crystallinity (heat of melting) and MFR properties similar to that resulting from the sole use of DCPMS. This discovery enables a two stage olefin polymerization process in which the weaker donor, TEOS, is used in the first stage to make polyolefins with the higher MFR characteristics of TEOS and employed in a second stage, a mixture of TEOS and DCPMS polymerization to produce a final polyolefin with a relatively low MFR, high crystallinity, and moderately broad MWD.

While a combination of polymer characteristics might ordinarily be expected from the use of a catalyst system employing two different stereoregulating electron donors, the unexpected result here is that there is a dominant donor effect and that the effects of the two donors is not averaged. As a result, minor amounts of DCPMS can be used in combination with TEOS to generate polyolefin polymers having the high crystallinity, and low MFR associated with the use of DCPMS. Operable amounts of the DCPMS silane electron donor of the preferred Dual Donor mixture are from about 10–99 mole percent DCPMS, the TEOS being present in quantities of from about 90–1 mole percent. A preferred ratio of DCPMS to TEOS is from about 30–70% DCPMS and from 70–30% TEOS. Most preferred ratios of DCPMS to TEOS, in the Dual Donor catalyst system of the present invention are 45–55 mol percent DCPMS to 55–45 mole percent TEOS.

Examples of olefins that can be used in the polymerization process of the present invention are alpha-olefins having 2 to 20 carbon atoms such as ethylene, propylene, 1-butene, 4-methyl-1-pentene, 1-octene, 1-hexene, 3-methyl-1-pentene, 3-methyl-1-butene, 1-decene, 1-tetradecene, and 1-eicosine.

In another preferred embodiment of the invention, a multi-stage process for the preparation of a polyolefin is provided in which the alpha-olefin is polymerized in two stages in the presence of (1) a magnesium supported catalyst system, and (2) an electron donor mixture of the two silane compounds, TEOS and DCPMS, comprising the steps of:

(A) a first stage polymerizing alpha-olefin in the presence of TEOS silane electron donor to produce a polyoiefin having an MFR of between 10 and 1200;

(B) in another stage, further polymerizing olefins in the presence of the polyolefin of step (A) in the presence of a mixture of TEOS/DCPMS thereby producing a polyolefin polymer having an MFR of between 1 and 120, and a MWD of less than 6.

Figure 2:
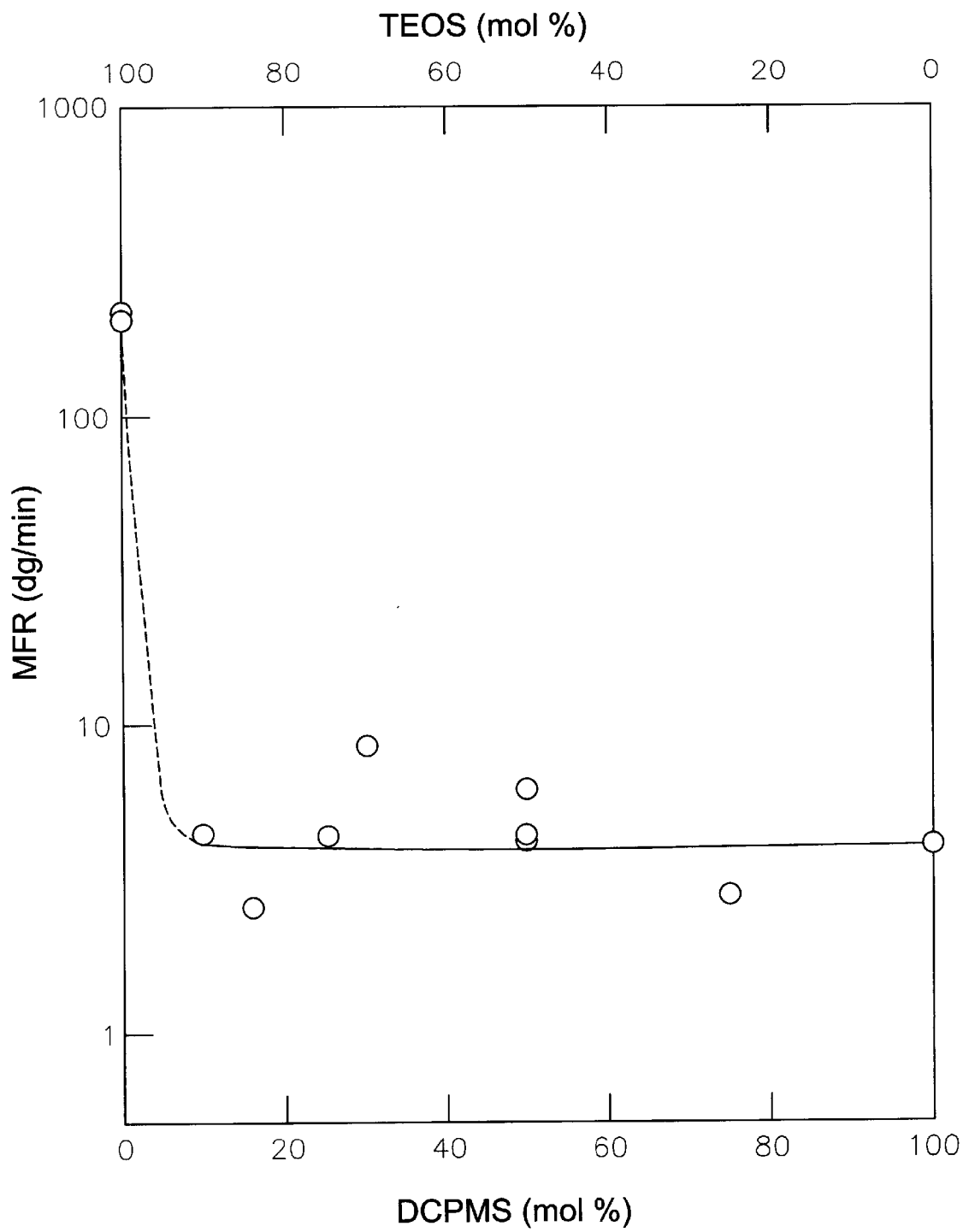
FIG. 2 is a graph plotting the relationship between MFR of the present polyolefins in relation to varying quantities of the dual electron donors of the present invention.
Figure 3:
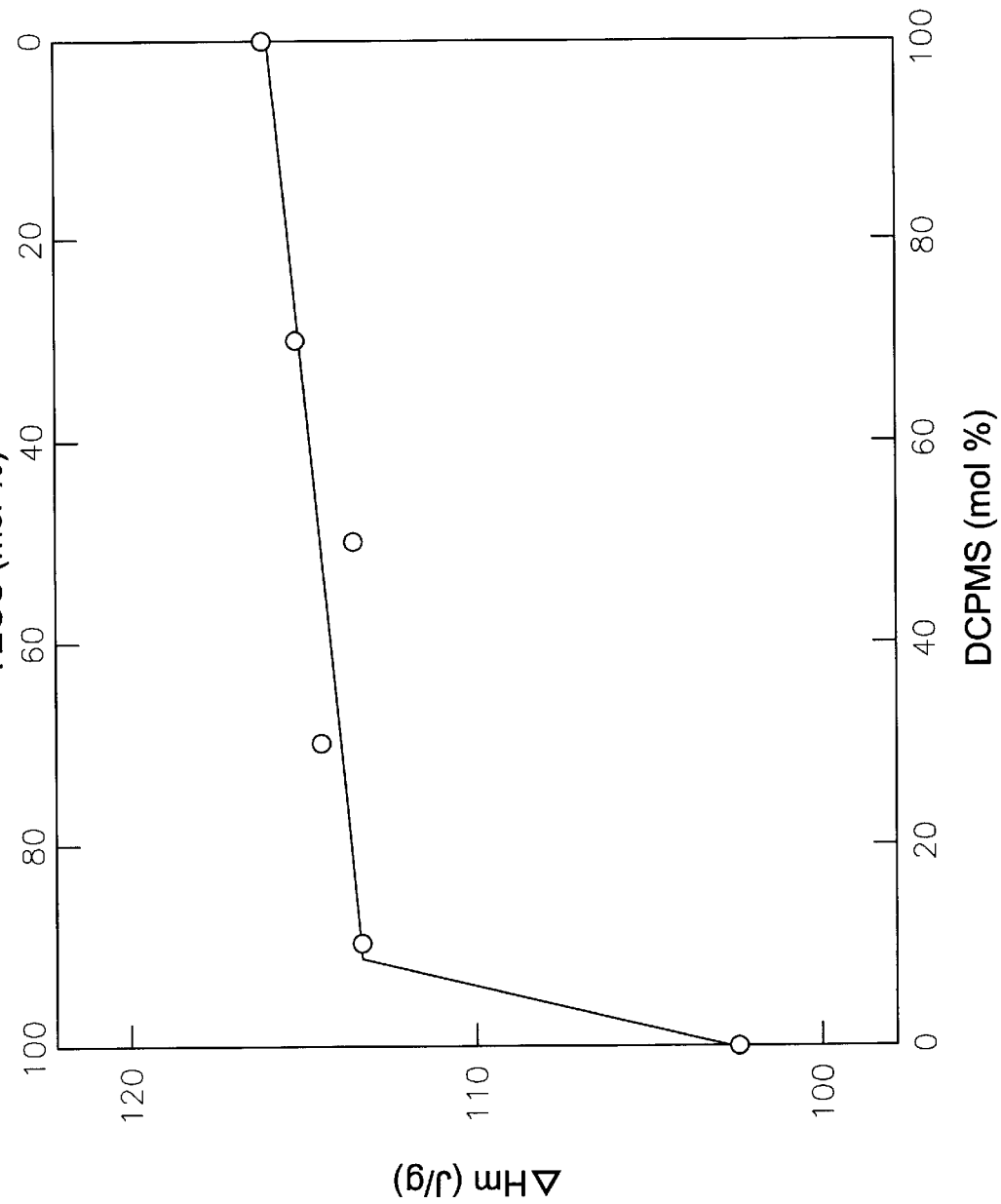
FIG. 3 is a graph plotting the relationship of the heat of melting polyolefin prepared using varying quantities of the dual electron donors of the present invention.

The complete set of data for FIGS. 1, 2, and 3 are tabulated in Tables 1, 2, and 3. The MFR-H2 response curves when using TEOS or DCPMS, respectively, are shown in FIG. 1. It shows the very high MFRs typical of the TEOS donor; and low MFRs typical of the DCPMS donor. The complete set of data used to construct this figure are tabulated in Tables 1 and 2.

The dramatic dominance of DCPMS is demonstrated in FIGS. 2 and 3, showing the MFR and (ΔH) behavior as a function of the DCPMS/TEOS mole ratio polymerized in a batch reactor. FIG. 1 shows that the MFR is virtually unchanged from 100% DCPMS to 10% DCPMS. FIG. 2 shows a similar behavior with crystallinity as measured by the DSC heat of melting. Again, the crystallinity is virtually unchanged from 100 to 10% DCPMS.

TABLE I

EFFECT OF HYDROGEN ON MFR WITH TEOS AS REACTOR DONOR

| | | | Polymerization Conditions | | | Polymerization Results | | | DSC Results | | | |
| --- | --- | --- | --- | --- | --- | --- | --- | --- | --- | --- | --- | --- |
| Catalyst Solid | Run No. 11373- | Cat. (mgs) | TEOS (mmole) | DCPMS (mmole) | Hydrogen (psi, 300 cc) | Activity (Kg/g hr) | MFR (dg/min) | HI (%) | Tc °C. | ΔHc J/g | Tm °C. | ΔHm J/g |
| TOHO—THC—C | 135–026 | 7.25 | 0.2 | — | 10 | 5.1 | 3.09 | — | 110.5 | 103.3 | 158.9 | 102.6 |
| | 135–029 | 7.23 | 0.2 | — | 40 | 20.0 | 26.4 | — | 109.5 | 109.8 | 158.4 | 109.4 |

TABLE I-continued
EFFECT OF HYDROGEN ON MFR WITH TEOS AS REACTOR DONOR

| Catalyst Solid | Run No. 11373- | Cat. (mgs) | Polymerization Conditions | | | Polymerization Results | | | DSC Results | | | |
|---|---|---|---|---|---|---|---|---|---|---|---|---|
| | | | TEOS (mmole) | DCPMS (mmole) | Hydrogen (psi, 300 cc) | Activity (Kg/g hr) | MFR (dg/min) | HI (%) | Tc °C. | ΔHc J/g | Tm °C. | ΔHm J/g |
| | 120–019 | 5.44 | 0.2 | — | 40 | 16.7 | 31.2 | 96.0 | — | — | — | — |
| | 122–032 | 15.8 | 0.2 | — | 80 | 20.7 | 53.2 | 94.9 | — | — | — | — |
| | 126–034 | 15.4 | 0.2 | — | 80 | 12.4 | 89.2 | 95.0 | — | — | — | — |
| | 127–002 | 13.5 | 0.2 | — | 150 | 13.2 | 197.0 | 95.4 | — | — | — | — |
| | 135–032 | 7.23 | 0.2 | — | 150 | | 229.9 | 94.4 | — | — | — | — |
| Mitsui TK220 | 126–022 | 15.0 | 0.2 | — | 180 | 10.4 | 143.2 | 92.6 | — | — | — | — |
| | 131–011 | 61.1 | 0.2 | — | 60 | 12.2 | 42.5 | 93.7 | — | — | — | — |

TABLE II
EFFECT OF HYDROGEN ON MFR WITH DCCPMS AS REACTOR DONOR

| Catalyst Solid | Run No. 11373- | Cat. (mgs) | Polymerization Conditions | | | Polymerization Results | | | DSC Results | | | |
|---|---|---|---|---|---|---|---|---|---|---|---|---|
| | | | TEOS (mmole) | DCPMS (mmole) | Hydrogen (psi, 300 cc) | Activity (Kg/g hr) | MFR (dg/min) | HI (%) | Tc °C. | ΔHc J/g | Tm °C. | ΔHm J/g |
| TOHO—THC—C | 135–022 | 6.9 | — | 0.2 | 40 | 17.4 | 5.68 | 97.1 | 114.7 | 117.0 | 163.2 | 115.6 |
| | 119–001 | 11.5 | — | 0.2 | 80 | 48.6 | 1.84 | 98.2 | — | — | — | — |
| | 120–018 | 6.24 | — | 0.2 | 80 | 20,9 | 1.76 | 98.4 | — | — | — | — |
| | 125–022 | 10.5 | — | 0.2 | 80 | 41.2 | 1.65 | 98.9 | — | — | — | — |
| | 125–021 | 9.0 | — | 0.2 | 80 | 42.1 | 1:26 | 98.9 | — | — | — | — |
| | 128–028 | 10.1 | — | 0.2 | 80 | 27.9 | 1.92 | 98.9 | — | — | — | — |
| | 135–024 | 8.0 | — | 0.2 | 150 | 64.3 | 4.07 | 98.0 | — | — | — | — |
| | 135–027 | 8.0 | — | 0.2 | 170 | 70.3 | 4.12 | 97.2 | — | — | — | — |
| | 133–020 | 13.6 | — | 0.2 | 400 | 31.7 | 16.8 | — | — | — | — | — |
| Mitsui TK220 | 134–012 | 31.7 | — | 0.2 | 80 | 30.4 | 2.58 | 98.5 | — | — | — | — |

TABLE III
EFFECT OF HYDROGEN ON MFR WITH A MIXTURE OF TEOS AND DCPMS AS REACTOR DONOR

| Catalyst Solid | Run No. 11373- | Cat. (mgs) | Polymerization Conditions | | | Polymerization Results | | | DSC Results | | | |
|---|---|---|---|---|---|---|---|---|---|---|---|---|
| | | | DCPMS (mmole) | TEOS (mmole) | Hydrogen (psi, 300 cc) | Activity (Kg/g hr) | MFR (dg/min) | HI (%) | Tc °C. | ΔHc J/g | Tm °C. | ΔHm J/g |
| TOHO—THC—C | 185–017 | 117 | 0.010 | 0.190 | 150 | 38.2 | 10.02 | 97.1 | 112.0 | 108.0 | 162.2 | 107.8 |
| | 135–036 | 7.61 | 0.020 | 0.180 | 150 | 67.7 | 4.39 | 97.4 | 112.8 | 113.3 | 163.8 | 113.0 |
| | 129–014 | 15.6 | 0.032 | 0.168 | 150 | 16.5 | 2.37 | 97.1 | — | — | — | — |
| | 129–013 | 13.8 | 0.050 | 0.150 | 150 | 28.7 | 4.49 | 97.4 | — | — | — | — |
| | 135–037 | 7.86 | 0.060 | 0.140 | 150 | 59.9 | 8.72 | 97.0 | 115.4 | 117.1 | 164.6 | 114.3 |
| | 136–005 | 7.50 | 0.100 | 0.100 | 150 | 62.9 | 6.41 | 96.6 | 112.5 | 113.3 | 165.0 | 113.3 |
| | 128–020 | 15.9 | 0.100 | 0.100 | 150 | 36.4 | 4.46 | 98.1 | — | — | — | — |
| | 128–026 | 10.7 | 0.100 | 0.100 | 150 | 41.4 | 4.36 | 98.3 | — | — | — | — |
| | 130–007 | 12.0 | 0.100 | 0.100 | 150 | 23.0 | 2.06 | 98.5 | — | — | — | — |
| | 128–021 | 16.8 | 0.100 | 0.100 | 80 | 26.8 | 1.87 | 98.4 | — | — | — | — |
| | 128–027 | 11.8 | 0.100 | 0.100 | 80 | 39.1 | 2.68 | 98.4 | — | — | — | — |
| | 136–012 | 6.75 | 0.150 | 0.050 | 150 | 63.2 | 2.57 | 98.2 | 114.0 | 115.2 | 164.2 | 115.0 |
| Mitsui TK220 | 131–035 | 18.5 | 0.100 | 0.100 | 80 | 17.2 | 3.57 | 97.8 | — | — | — | — |

TABLE IV

TWO-STAGE POLYMERIZATION USING DUAL DONOR

| | | | Polymerization Conditions | | | Polymerization Results | | | DSC Results | | | |
|---|---|---|---|---|---|---|---|---|---|---|---|---|
| Catalyst Solid | Run No. 11373- | Cat. (mgs) | TEOS (mmole) | DCPMS (mmole) | Hydrogen (psi, 300 cc) | Activity (Kg/g hr) | MFR (dg/min) | HI (%) | Tc °C. | ΔHc J/g | Tm °C. | ΔHm J/g |
| (A) First stage - one hour polymerization time | | | | | | | | | | | | |
| Mitsui TK 220 | 132–014 | 31.3 | 0.200 | — | 80 | — | — | — | — | — | — | — |
| (B) Second stage - one hour polymerization time | | | | | | | | | | | | |
| Mitsui TK 220 | — | — | — | 0.200 | — | 14.0 | 44.7 | 94.0 | 109.5 | 101.3 | 158.2 | 102.4 |

TABLE V

COMPARATIVE EXAMPLE
HIGH MFR POLYPROPYLENE FROM USING TEOS ONLY

| | | | Polymerization Conditions | | | Polymerization Results | | | DSC Results | | | |
|---|---|---|---|---|---|---|---|---|---|---|---|---|
| Catalyst Solid | Run No. 11373- | Cat. (mgs) | TEOS (mmole) | DCPMS (mmole) | Hydrogen (psi, 300 cc) | Activity (Kg/g hr) | MFR (dg/min) | HI (%) | Tc °C. | ΔHc J/g | Tm °C. | ΔHm J/g |
| Mitsui TK 220 | 131–011 | 61.1 | 0.2 | — | 60 | 12.2 | 42.5 | 937 | 109.0 | 94.8 | 158.1 | 97.2 |

TABLE VI

| DONOR | MWD |
|---|---|
| DCPMS | 5.0 |
| TEOS | 6.1 |
| DCPMS/TEOS (50/50) | 5.2 |

Tables IV and V demonstrate the results using the two stage polymerization process of the present invention. It demonstrates higher crystallinity for the two stage polymer product compared to the use of TEOS alone, both are at the same MFR.

As additional evidence of the dominance of DCPMS over TEOS, Table 6 above shows typical MWD obtained with polymerization using TEOS, DCPMS, and a 50/50 blend of TEOS/DCPMS, respectively. The MWD data of the mixed donor system is unexpected and atypical. Catalyst systems with two donors without a dominating donor, when mixed, should produce polymers with a broader MWD than either polymer produced with a single donor. However, as can be appreciated from Table 6, the MWD of the mixed donor is not broader, and is very close to that of DCPMS.

Processes for practice of the instant mixed donor invention are outlined as follows:

A. Process for Polypropylene Homopolymer/Impact Copolymer Polymerization in Batch Reactors The polymerization of propylene within an autoclave batch reactor using a mixed donor catalyst system shows the dominant nature of DCPMS over TEOS. In combination with a $TiCl_4$ magnesium supported catalyst system, donors generally stereoregulate the polymerization of propylene to make higher or lower crystallinity polymers and the split between the amount of isotactic, syndiotactic, and atactic polymer produced as for the contribution of each of the mixed donors. DCPMS acts as a high stereoregulator donor, while TEOS is a low stereoregular donor. However, at the same H2 level, DCPMS produces a much lower melt flow rate polymer than that of TEOS. When combined, the properties of the polymer produced follow much closer to that of DCPMS than a weighted property averages of the two pure systems.

The batch polymerization of propylene based polymers using the mixed donor technology is used in two ways: (1) in a pure batch mode where the two donors are premixed and reacted with the magnesium supported $TiCl_4$ catalyst, made to form a slurry and injected into an autoclave type reactor, or (2) in a semi-batch mode composed of two stages. In the first stage only a single donor, TEOS, is premixed and reacted with the magnesium supported $TiCl_4$ catalyst, made into a slurry and injected into an autoclave type reactor. Polymerization with this single donor catalyst system continues for some preset time period, followed by the injection of the second donor, DCPMS, where the polymerization again continues for a second preset time period. In the pure batch mode, the polymer created closely resembles that of DCPMS alone; while in the semi-batch mode, only the polymer produced in the second stage closely resembles that of DCPMS. The semi-batch produced polymer therefore is effectively an intimate mixture of (A) high melt flow rate, low crystallinity TEOS produced polymer and (B) low melt flow rate, high crystallinity TEOS/DCPMS produced polymer. The overall melt flow rate polymerization window of the semi-batch process however, is much greater than that of the pure batch process.

B. Continuous Process for Making Impact Copolymer

Polymerization was carried out using a multi-stage continuous process, where the first two reactors are of bulk liquid propylene slurry stirred tank reactors type, followed by an additional reactor of gas phase fluidized bed reactor type. Polypropylene homopolymer is produced by a polymerization of propylene within the two Bulk Propylene Slurry reactors followed by a polymerization of 20–80% ethylene and 80–20% propylene copolymer within the Gas Phase reactor. This intimate mixture of homopolymer and ethylene/propylene copolymer is known in the trade as an "Impact Copolymer (ICP)". The composition of the final product is an ICP having between 0–50% ethylene/propylene copolymer and 100–50% propylene homopolymer. The total percent ethylene of these products range from 0 to 25%; and typical ICP melt flow rates range form 0.1 to 200.

To achieve high MFR and moderately broad MWD products, the two silane donors, TEOS and DCPMS, are added separately to the two Bulk Liquid reactors: TEOS is first injected in the first reactor, followed by DCPMS injection in the second reactor. In the configuration used, a recycle system is returned to the second reactor. (No additional donor is introduced during the ethylene/propylene polymerization step). This effectively creates a multi-stage process where the first reactor has exclusively the TEOS donor, while the second reactor has a combination of TEOS and DCPMS. Since DCPMS is dominant over TEOS, the second mixed donor reactor behaves very closely to one with DCPMS by itself. A high MFR, high heat of melting polymer is achieved. Alternatively if a high crystallinity ICP is desired, a recycle stream is returned to the first reactor. In the instant description, a multi-stage process is created with TEOS and DCPMS within both reactors.

The following Examples and Comparative Examples illustrate the present invention and its various advantages in more detail. The results are summarized in Tables 1–4.

Catalyst

The catalyst provided herein is a magnesium supported catalyst sold commercially by Toho Titanium Corporation of Japan and identified as THC-C type catalyst and that sold by Mitsui Petrochemical Corporation of Japan described as TK-220.

EXAMPLE 1

(I) One Stage Polymerization

In a 2 liter autoclave polymerization reactor that has been cleaned, dried, and purged well with nitrogen was charged by a syringe the millimoles of silane donor (0.1M solution in hexane), followed by the addition of 2 millimoles of TEAL (triethyl aluminum in hexane). After isolating the reactor, the required amount of hydrogen was introduced into the reactor as measured by the psi drop from a 300 cc vessel. Then 1000 ml of propylene was next added into the reactor. This was followed by introducing the required amount of catalyst slurried in the mineral oil as 15 or 20 weight percent solids which was pushed into the reactor with 250 cc of propylene. The reactor contents temperature was raised from room temperature to 70° C., and the reaction was continued for 1 hour. After the polymerization period, the excess propylene was vented out of the reactor and the polymer collected and dried in a vacuum oven. The polymer was pelletized with the addition of 500 ppm BHT, and samples were taken for heptane insoluble, MFR, MWD, and DSC measurements.

EXAMPLE 2

(II) Two Stage Polymerization Example

The polymerization process was similar to that of Example 1, except that initially 0.2 mmole of TEOS was introduced into the reactor and 750 ml of propylene was first added into the reactor. After one hour polymerization, 0.2 mmol DCPMS was pushed into the reactor with 250 ml propylene, and the polymerization was continued for an additional one hour. The results showed 44.7 dg/min MFR, 94.0 HI, 12,600 gPP/g-cat-hr activity, and 4.72 polymer MWD. Analysis of the polymer showed the following composition:

|  | First Stage | Second Stage | Final Product |
|---|---|---|---|
| Donor | TEOS | TEOS/DCPMS |  |
| Activity (Kg/g hr) | 10.0* | 2.7*** |  |
| MFR | 70.0* | 7.0** | 44.7 |
| MWD | 6.09* |  | 4.72 |

*Obtained from Example 1
*Obtained from back calculation using log/log blending of MFRs from First and Second stage polymer amount and MFR
***Obtained by difference.

These results show that the back-calculated MFR from the second stage polymerization corresponds to the expected MFR from the Example 1 polymerization using a 50/50 mole blend of DCPMS/TEOS.

The following example is of a continuous two stage polymerization using the Dual Donor invention for making ICP.

EXAMPLE 3

Two Stage Process

The continuous process consists of two bulk liquid reactors in series followed by a single gas phase reactor. Generally, homopolypropylene is polymerized within the bulk liquid reactors followed by an ethylene/propylene copolymerization. The final product is called an "impact copolymer ("ICP"). The Dual Donor two stage process consists of feeding two different donors within the two liquid bulk reactors. In this example, TEOS is added in the first liquid reactor; and DCPMS is added in the second liquid reactor. In the lead reactor, the TEOS donor produces a high MFR resin (20–1000), while in the tail reactor, the mixture of donors TEOS/DCPMS produces a lower MFR resin (0.1–100). The resultant polymer is transferred in to a gas phase reactor where an ethylene/propylene rubber is polymerized.

Typical process conditions used are given as follows. Temperatures within the bulk liquid reactors range from 148 to 158° F. Hydrogen and triethylaluminum (TEAL) concentrations within the liquid reactors are 10,000 ppm and 60–78 ppm, respectively. TEOS concentration within the first stage was 16 ppm, while within the second stage, a mixture of TEOS (15 ppm) and DCPMS (22 ppm) was used. Typical production splits between the first and second stage reactors are 65:35. Within the gas phase reactor, the temperature was 158° F. at 200 psig, with an ethylene to monomers ratio of 0.305. The total amount of ethylene/propylene copolymer produced within the gas phase reactor was 30% of the final ICP.

Comparative Examples

Two comparative examples of the Dual Donor system are given using a single stage continuous process. This first comparative example employs the use of a mixture of TEOS and DCPMS polymerized under comparable conditions as that shown in the two stage process. The second comparative example employs the use of a single donor TEOS used under similar conditions as the two stage process.

Results

Figure 4:
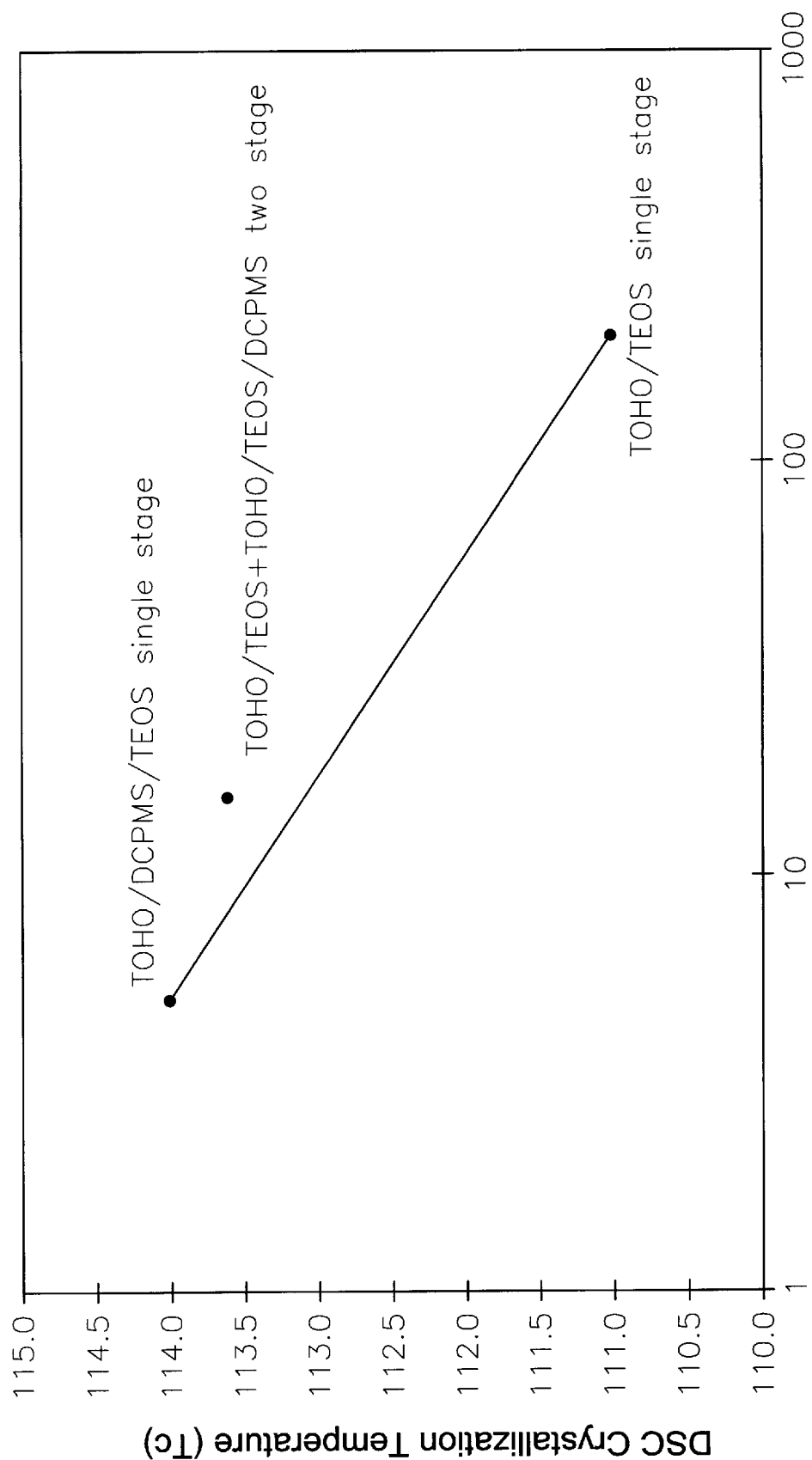
FIG. 4 is a graph plotting the relationship between the log of melt flow rates of polymer prepared in a single stage process, and the multi-stage process of the present invention.

FIG. 4 shows that the two stage/mixed donor process polymer has a higher balance of crystallinity vs. melt flow rate. The two stage process polymer has a high crystallinity (DSC crystallization temperature) and a high melt flow rate. This balance of crystallinity vs. melt flow rate produced by the two stage process is higher than is expected from the averaged properties of the two single stage processes (TEOS and TEOS/DCPMS). This data show a polymer synergy when polymerized in a two stage process.

The preferred embodiments of the present invention, as described above, are not intended to limit the scope of the present invention, as demonstrated by the claims which follow, since one skilled in the art can, with minimal experimentation, extend the scope of the embodiments.

We claim:

1. A process for olefin polymerization in at least two stages comprising:
    a) polymerizing propylene monomers in a first stage in the presence of:
        (1) a solid magnesium supported titanium catalyst component including an internal electron donor,
        (2) an organoaluminum co-catalyst, and
        (3) a first external electron donor, TEOS;
    b) further polymerizing propylene monomers in a second stage utilizing the catalyst system of (a) and both said first external electron donor and a second external electron donor, wherein said second external electron donor is DCPMS.

2. The process of claim 1, wherein said solid magnesium supported component is a magnesium supported $TiCl_4$, and wherein said organoaluminum co-catalyst is selected from the group consisting of trimethyl aluminum, triethylaluminum, triisobutylaluminum, and triisobutylaluminum, an alkylaluminum dihalide, a trialkoxyaluminum, and a dialkylaluminium halide.

3. The process of claim 2 wherein said co-catalyst is triethylaluminum and wherein said DCPMS and TEOS are present in said second stage in the range of 10 to 99 mole percent DCPMS and 1 to 90 mole percent TEOS.

4. The process of claim 2 wherein said co-catalyst is triethylaluminum and wherein said TEOS and said DCPMS are present in said second stage in the ratio of from about 70 to 30 mole percent to about 30 to 70 mole percent.

5. A method for polymerizing or copolymerizing olefins consisting essentially of:
    (A) forming a solid magnesium supported titanium catalyst component including an internal electron donor;
    (B) forming a halogen-free organoaluminum compound;
    (C) polymerizing propylene monomers in the presence of products of (A) and (B), and TEOS in a first reaction stage;
    (D) polymerizing propylene monomers in the presence of (A), (B), and a combination of DCPMS and TEOS in another reaction stage.

6. The method of claim 5 wherein said organoaluminum compound is triethylaluminum, and wherein said combination of DCPMS and TEOS are present in the mole ratio of from about 30 to about 70 percent and from about 70 to about 30 percent, based on the relative presence of the DCPMS and TEOS.

7. A multi-stage process for preparation of a polyolefin comprising polymerizing propylene monomers in the presence of a solid magnesium supported $TiCl_4$, triethylaluminum, TEOS, and DCPMS wherein:
    i) in a first stage polymerizing propylene monomers in the presence of said TEOS; and
    ii) in another stage polymerizing propylene monomers in the presence of a mixture of TEOS and DCPMS wherein said mixture is present in a mole ratio of DCPMS to TEOS from 70 to 30, to 30 to 70 mole percent.

8. A multi-stage process for preparation of a polyolefin comprising:
    A) polymerizing propylene monomers in a first stage in the presence of
        i) a solid magnesium supported $TiCl_4$;
        ii) triethylaluminum; and
        iii) tetraethoxysilane;
        producing a polyolefin having a MFR of between 10 and 1,200;
    B) further polymerizing the propylene monomers in another stage with i) and ii) and a mixture of tetraethoxysilane and dicyclopentyldimethoxysilane, to produce a polyolefin having a MFR of between 1 and 120.

9. In a multi-stage process for preparation of a polyolefin comprising:
    A) polymerizing propylene monomers in a first stage in the presence of a solid magnesium supported $TiCl_4$, triethylaluminum, and a silicon compound; and
    B) further polymerizing propylene monomers in another stage, the improvement comprising said silicon compound in said first stage is tretraethoxysilane and wherein a polyolefin produced by A has a MFR of between 10 and 1,200; wherein in B) the further polymerization includes a mixture of tetraethoxysilane and dicyclopentyldimethoxysilane, to produce in said B) a polyolefin having a MFR of between 1 and 120.

10. A method for polymerizing or copolymerizing propylene monomers or propylene and ethylene monomers comprising:
    (A) forming a solid magnesium supported titanium catalyst component including an internal electron donor;
    (B) forming a halogen-free organoaluminum compound;
    (C) polymerizing or copolymerizing propylene monomers or propylene and ethylene monomers in the presence of products of (A) and (B), and TEOS in a first reaction stage; and
    (D) polymerizing or copolymerizing propylene monomers or propylene and ethylene monomers in the presence of (A), (B), and a combination of DCPMS and TEOS in a second reaction stage wherein said DCPMS controls the MFR of a polyolefin produced in (D), where the combination of said DCPMS and TEOS in said second reaction stage contains a mole percent ratio of TEOS/DCPMS of from 10 to 90, to 95 to 5.

11. A method of forming a high impact copolymer comprising:
    polymerizing propylene monomers in the presence of TEOS to form a first polymer product;
    in the presence of the first polymer product and TEOS polymerizing propylene monomers in the presence of DCPMS to form a second polymer product; and
    in the presence of the second polymer product polymerizing propylene monomers and ethylene monomers.

12. The method of claim 11 wherein the high impact copolymer has an overall copolymer content in the range of 1 to 49 percent.

13. The method of claim 11 wherein the high impact copolymer has an overall homopolymer content in the range of 99 to 51 percent.

14. The method of claim 11 wherein the high impact copolymer has an overall ethylene content in the range of 1 to 25 percent.

15. The method of claim 11 wherein an article is formed from the high impact copolymer.

16. The method of claim 12 wherein an article is formed from the high impact copolymer.

17. The method of claim 13 wherein an article is formed from the high impact copolymer.

18. The method of claim 14 wherein an article is formed from the high impact copolymer.

19. A method of forming a high impact copolymer comprising:

polymerizing propylene monomers in the presence of TEOS to form a polymer product;

in the presence of the polymer product and TEOS, polymerizing propylene monomers in the presence of DCPMS thereby forming an propylene homopolymer; and in the presence of the propylene homopolymer, polymerizing propylene and ethylene.

20. The method of claim 19 wherein the high impact copolymer has an overall copolymer content in the range of 1 to 49 percent.

21. The method of claim 19 wherein the high impact copolymer has an overall homopolymer content in the range of 99 to 51 percent.

22. The method of claim 19 wherein the high impact copolymer has an overall ethylene content in the range of 1 to 25 percent.

23. A method of forming a high impact copolymer having a melt flow rate in the range from 0.1 to 200 dg/min comprising:

polymerizing in a first reactor propylene monomers in the presence of TEOS to form a first polymer product;

in the presence of the first polymer product and TEOS, polymerizing in a second reactor propylene monomers in the presence of DCPMS thereby forming a second polymer product, where the combination of said DCPMS and TEOS is present in a mole percent ratio of TEOS/DCPMS of from 10 to 90, to 95 to 5; and in the presence of the second polymer product polymerizing in a third reactor at propylene monomers and ethylene monomers wherein the high impact copolymer has an overall copolymer content in the range of 1 to 49 percent and an overall homopolymer content in the range of 99 to 51 percent and wherein the high impact copolymer has an overall ethylene content in the range of 1 to 25 percent.

24. The method of claim 22 wherein the first reactor and second reactor are separate slurry reactors and the third reactor is a gas phase reactor.

25. The method of claim 22 wherein an article is formed from the high impact copolymer.

* * * * *